Jan. 11, 1955   H. A. HECKENDORF   2,699,145
STANDPIPE TYPE MILK RELEASER
Filed Nov. 7, 1952   2 Sheets-Sheet 1
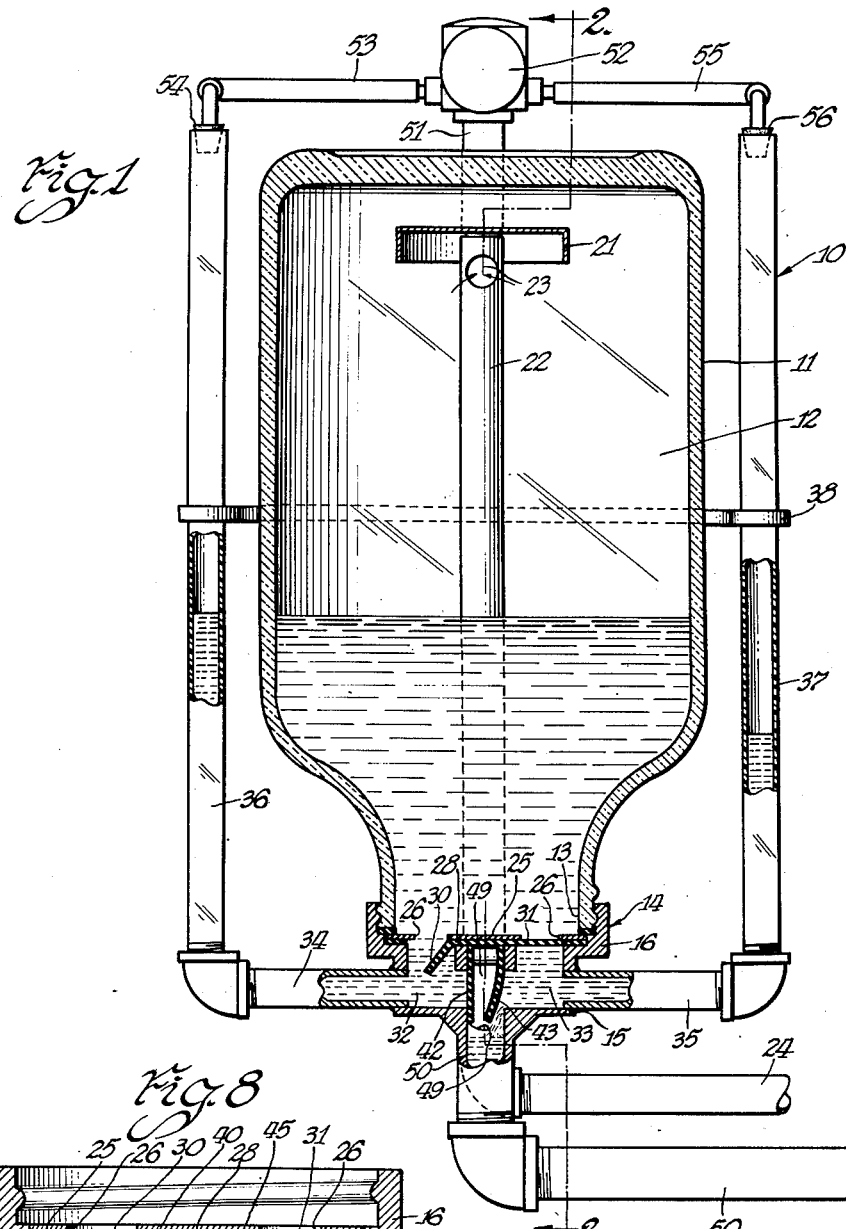
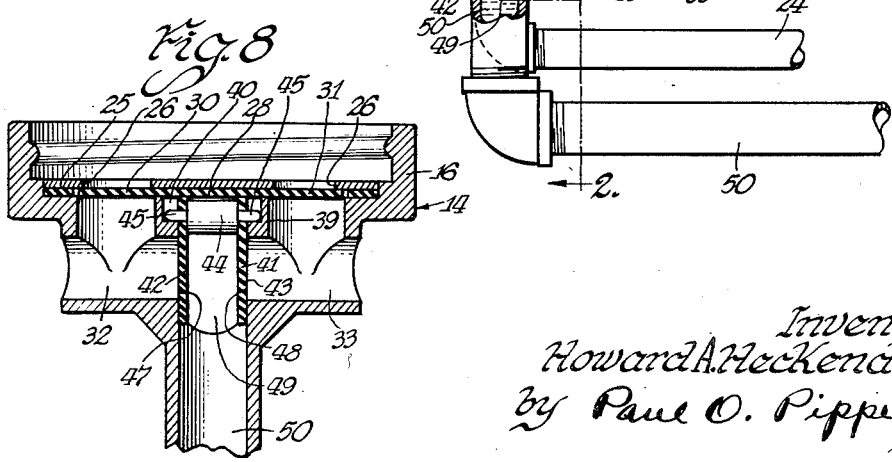
Inventor
Howard A. Heckendorf
by Paul O. Pippel
Atty.

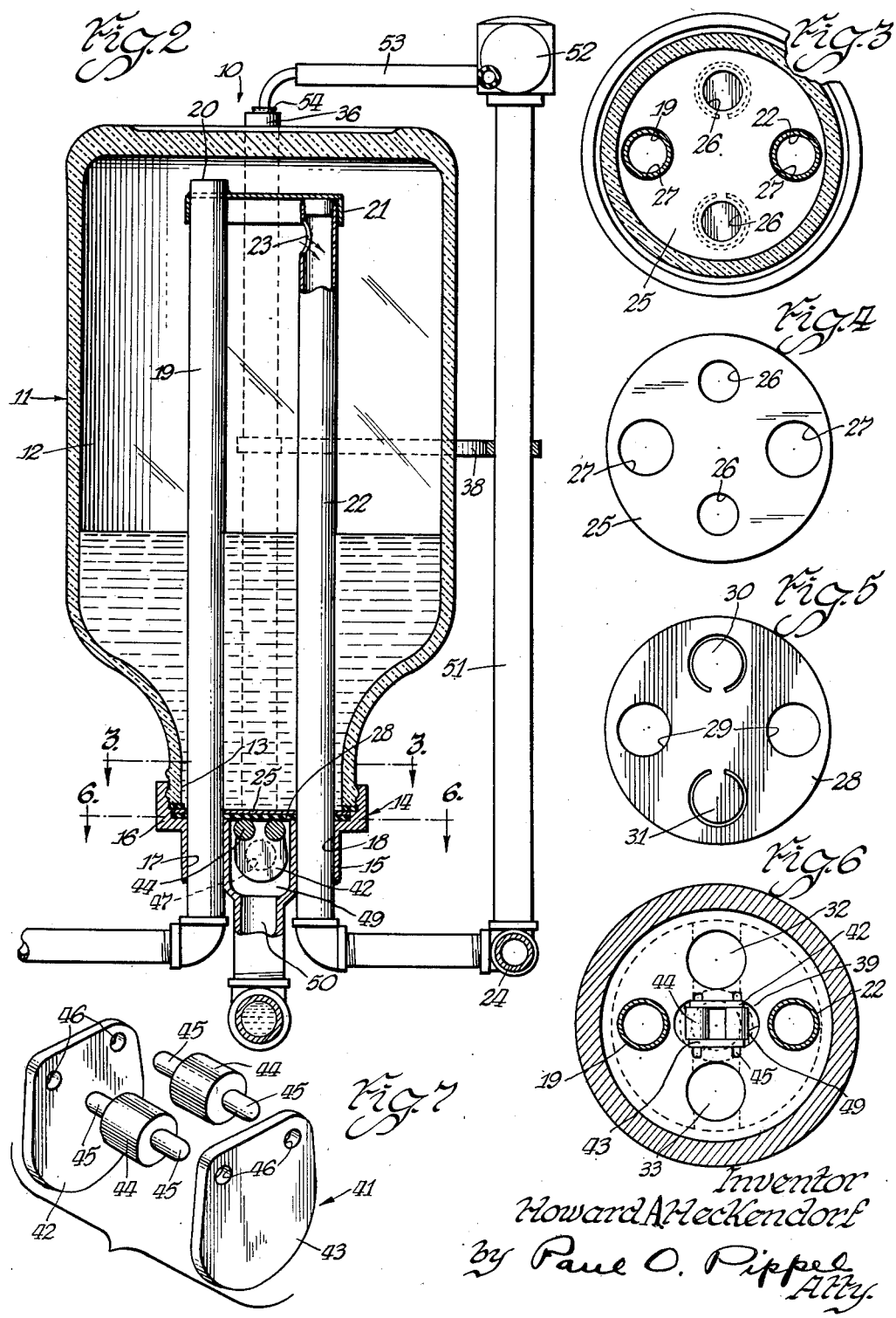

United States Patent Office 2,699,145
Patented Jan. 11, 1955

2,699,145

STANDPIPE TYPE MILK RELEASER

Howard A. Heckendorf, Chicago, Ill., assignor to International Harvester Company, a corporation of New Jersey Application November 7, 1952, Serial No. 319,309

9 Claims. (Cl. 119—14.06)

This invention relates to an improvement in milk releasers. More particularly the invention relates to an improved releaser mechanism particularly adapted to efficiently release milk from under vacuum existing in a pipe-line milking system.

It is a prime object of this invention to provide an improved milk releaser, the releaser including a container which is in communication with a pair of standpipes, the standpipes being disposed to alternately receive milk from the container when the standpipes and the container are under a vacuum equalization, the standpipes also being adapted to release and discharge the milk when the standpipes are placed under atmosphere or pressure.

Still another object is to provide an improved milk releaser including a container which is continually under vacuum and to which milk is continually delivered, the container being connected to a pair of standpipes having a relatively smaller volume capacity, the standpipes being connected to a pulsating unit whereupon the standpipes are alternately subjected to vacuum and atmosphere, the container including a valve structure whereby milk from the container is discharged to one standpipe under vacuum, the quantity of milk so discharged being determined by the level within the container, the other standpipe being under pressure and being arranged to discharge the quantity of milk previously directed thereto into a milk outlet conduit which is connected to the pipe line of a milking system.

A still further object is to provide an improved milker releaser of a type having a pair of standpipes connected thereto, the releaser including valves for discharging milk from the container to the standpipes and subsequently the standpipes to a discharge outlet, the disposition of the valves with relation to the standpipes being such that operation of one set of valves assists in the operation of the other set of valves thereby producing a more efficient releasing operation.

These and further objects will become more apparent from a reading of the specification when examined in connection with the accompanying sheet of drawings:

Figure 1 is a front elevational view of a milker releaser and associated piping structure, the releaser having pertinent portions thereof shown in section;

Figure 2 is a cross-sectional view through Figure 1 taken along the line 2—2;

Figure 3 is a sectional view taken along the line 3—3 of Figure 2;

Figure 4 is a detailed view of a valve plate;

Figure 5 is a detailed view of a valve gasket;

Figure 6 is a sectional view of a valve structure, the view being taken substantially along the line 6—6 of Figure 2;

Figure 7 is an exploded perspective view of a valve assembly; and

Figure 8 is a cross-sectional view through a valve structure of a milker releaser.

Referring particularly now to Figures 1 and 2, a milk releaser is generally designated by the reference character 10. The milk releaser 10 comprises a jar or container 11 having a chamber 12. The jar or container 11 may consist of a transparent material having an open end 13 with the jar positioned in an inverted position.

The container or jar 11 is provided at its lower end with a valve structure 14 comprising a casing 15. The casing 15 is provided with a jar-type threaded flange 16 which is suitably connected over the open end 13 of the container 11. The casing 15, as best shown in Figure 2, is provided with bores 17 and 18. A milk inlet pipe 19 extends through the bore 17, the pipe 19 extending upwardly and terminating short of the upper end of the container 11 as indicated at 20. The upper end of the inlet pipe 19 is connected to an umbrella bracket 21 to which also an air outlet pipe 22 is connected. The air outlet pipe 22 is provided with openings 23 and extends downwardly through the bore 18. The air outlet pipe 22 is suitably connected to a vacuum pipe 24 which is in turn adapted to be connected to a source of vacuum or vacuum pump (not shown).

A valve plate 25 having valve openings 26 is supported on the casing 15. The valve plate 25 also has openings 27 which are positioned to accommodate the pipes 19 and 22 which project into the chamber 12. The valve-plate 25 is suitably and tightly screwed up against a flexible gasket 28. The gasket 28 as best shown in Figure 5 is provided with openings 29 which accommodate pipes 19 and 20. The gasket 28 also includes flap valves 30 and 31 which are adapted as best indicated in Figure 8 to regulate valve openings 26.

Disposed beneath the flap valves 30 and 31, there are provided on the casing 15, discharge chambers 32 and 33. Conduits 34 and 35 respectively connected to the discharge chambers 32 and 33. The conduit 34 is connected to a laterally spaced and vertically extending standpipe 36. The conduit 35 is connected to a laterally spaced and vertically extending standpipe 37. The standpipes 36 and 37 are suitably held in the laterally spaced relation by means of a bracket 38.

A central portion 39 of the casing 15 is provided with a recess 40 in which a flap valve assembly 41 is positioned. The flap valve assembly 41 is particularly well shown in Figure 7. The assembly 41 comprises a pair of laterally spaced flap valves 42 and 43 which are suitably held in the spaced relation by means of spacers 44. The spacers 44 are provided with projecting pins 45 which suitably engage openings 46 in the flap valves 42 and 43 in telescoping relation. As best indicated in Figure 8, the spacers 44 are suitably held within the recess 40, and the flap valves 42 and 43 depend downwardly respectively covering openings 47 and 48 respectively positioned adjacent chambers 32 and 33. The flap valves 42 and 43 are so laterally spaced as to provide a discharge chamber 49. The discharge chamber 49 is particularly well shown in Figures 1 and 8 and is in communication with a discharge outlet 50.

A vacuum pipe 51 extends upwardly from the vacuum pipe 24, the pipe 51 being in communication with and supporting a pulsating unit 52. The pulsating unit 52 may be of a conventional construction and need not be disclosed in detail. The type shown is conventionally used in milking operations and is effective to alternately supply vacuum and pressure to the teat cups of a milking system (not disclosed). The pulsator 52 is suitably connected to a vacuum and air conduit 53 which is in communication with the standpipe 36 as indicated at 54. A vacuum and atmosphere conduit 55 also extends from the pulsator 52 and is connected to the standpipe 37 as indicated at 56.

In operation milk is continually delivered through the milk inlet conduit 19 to the chamber 12. Air from the chamber 12 is continually exhausted by means of the air outlet conduit 22 which is connected to the vacuum line 24. The pulsator 52 is effective by virtue of its connections 53 and 55 to the standpipes 36 and 37 to alternately supply vacuum and pressure to these standpipes. By the term "pressure" it is, of course, meant atmospheric pressure or a higher pressure. The pulsator 52 is arranged to alternately expose the standpipes 36 and 37 to the atmosphere. The operation of the pulsator 52 is such that when one standpipe is under vacuum the other standpipe is under pressure. Since the chamber 12 is under vacuum the flap valves 30 and 31 are normally closed against the valve plate 25. As the standpipe 36 is now subjected to vacuum the pressure within the standpipe 36 and within the chamber 12 is equalized. The weight of the milk within the container 12 thereupon operates on the flap valve 30 to open the same as indicated in Figure 1 whereupon milk flows through the conduit 34 and into the standpipe 36. The quantity of milk flow to the standpipe 36 is dependent upon the level of the milk within the container 12.

As indicated, the milk flows into the standpipe 36 until the same level is obtained within the standpipe as exists within the container 12. In other words, the milk seeks its own level within the standpipe and the level within the container determines the level within the said standpipe. The standpipes 36 and 37 are of comparatively small diameter construction and the volume delivered to the standpipes during each stroke of the vacuum pulsator is relatively small. The pulsator 52, however, may function in a rapid manner so that the release of milk to the standpipes and its subsequent discharge may be quite rapid. When the standpipe 36 has been filled with milk to the proper level it is then subjected to atmosphere or pressure by the pulsator 52. Immediately as the standpipe 36 is subjected to atmosphere the vacuum within the chamber 12 is effective to draw the valve 30 over the opening 26 to seal the same with respect to the chamber 32. Since the standpipe 36 is now under atmosphere, the pressure within the discharge conduit 50 and the chamber 32 are equalized whereupon the milk in the standpipe 36, under gravity, flows beyond the valve 42 and to the discharge pipe 50.

When the standpipe 36 is under atmosphere, the pulsator 52 is effective to place the standpipe 37 under vacuum. The standpipe 37 now being under vacuum causes milk to flow through the right hand opening 26, shown in Figure 1, until the milk within the standpipe 37 seeks its own level. During the vacuum condition within the standpipe 37 the valve 43 is positioned over the opening 48 to seal the same. Immediately upon the change from vacuum to atmosphere within the standpipe 37, the flap valve 43 is opened by the force of the milk flowing through the opening 48 into the discharge conduit 50. The filling and discharge of the standpipes 36 and 37 therefore is alternate, the standpipes being alternately subjected to atmosphere and vacuum. This cycle of operation is continually repeated and the milk releaser is effective to continually release and discharge milk to the milk outlet 50 from the chamber 12. Thus, milk is continually flowing into the chamber 49 as it is being released from the container so that a continual flow is maintained.

The relative position of the valves 42 and 43 is particularly effective to increase the efficiency of the releasing action. For instance, as the valve 43 is moved to a closed position, upon the vacuum condition occurring within the standpipe 37, the valve is moved by the air pressure which exists within the chamber 49. Since at this time however, the standpipe 36 is submitted to atmosphere, the liquid in the standpipe 36 is immediately directed to the chamber 49, this milk also exerting pressure on the valve 43 for assisting the closing of the same. Likewise, the same action takes place on the valve 42 when the standpipe 36 is under vacuum and thus the valves 42 and 43 are not only closed by means of the differential between vacuum and air in the chambers 49 and 32 or 49 and 33, but the liquid which is released from either of the chambers 32 and 33 is also effective to alternately react upon the valves 42 and 43 thus assuring their quick and efficient operation. Thus, the action of the valves 42 and 43 is very prompt and the pulsator can be set at a high speed of operation to effectively and efficiently release the milk. It might be described that the action of one of the standpipes and associated valve structures complements the other is such a manner that a full rhythm is established which provides an effective milking release operation. The utilization of the standpipes is also extremely effective in order to speed up the operation. As the milk in such standpipe seeks its own level, and upon a subsequent submission of each standpipe to the atmosphere, a head is created which serves to quickly and completely empty each standpipe in the time interval at which it is under pressure. Thus, a maximum efficiency is obtained.

It can now be seen that the objects of this invention have been fully achieved and that an improved milker release unit has been disclosed which fully accomplishes the stated objects of the invention. It must be understood that changes may be made in the construction which do not depart from the spirit of the invention as disclosed or the scope thereof as defined in the appended claims.

What is claimed is:

1. A milk releaser comprising an upright container having a chamber, said chamber including first and second laterally spaced discharge openings positioned adjacent the lower end of said chamber, a milk inlet conduit communicating with said chamber for supplying milk thereto, an air outlet conduit in communication with said chamber, means adapted to connect said air outlet conduit to a source of vacuum, first and second conduits respectively disposed below said first and second discharge openings for communication therewith, a first standpipe connected to said first conduit, a second standpipe connected to said second conduit, said standpipes being laterally spaced with respect to said container, extending in an upright direction and having major portions thereof disposed between the upper and lower ends of said upright container, a first valve over said first discharge opening, a second valve over said second discharge opening, said valves being movable from said openings during a vacuum equalization between said chamber and said standpipes for discharging milk by gravity to said standpipes, an outlet conduit having an opening adapted to communicate with said first and second conduits to receive milk therefrom, said outlet conduit being in communication with the atmosphere, a third valve between said first conduit and said outlet conduit, a fourth valve between said second conduit and said outlet conduit, said third and fourth valves being movable to provide for communication between said outlet conduit and said first and second conduits during a pressure equalization between said conduits, and a pulsating unit connected to said standpipes for alternately subjecting said standpipes to pressure and vacuum, one of said standpipes being under vacuum while the other is under pressure whereby during the vacuum in said standpipes milk is discharged to the standpipes and during pressure in said standpipes milk is discharged to said outlet pipe.

2. A milk releaser comprising an upright container having a chamber, said chamber including first and second laterally spaced discharge openings positioned adjacent the lower end of said chamber, a milk inlet conduit communicating with said chamber for supplying milk thereto, an air outlet conduit in communication with said chamber, means adapted to connect said air outlet conduit to a source of vacuum, first and second conduits respectively disposed below said first and second discharge openings for communication therewith, a first standpipe connected to said first conduit, a second standpipe connected to said second conduit, said standpipes being laterally spaced with respect to said container and having major portions thereof disposed between the upper and lower ends of said container, a first valve over said first discharge opening, a second valve over said second discharge opening, said valves being movable from said openings during a vacuum equalization between said chamber and said standpipes for discharging milk to said standpipes, an outlet conduit having an opening adapted to communicate with said first and second conduits to receive milk therefrom, said outlet conduit being in communication with the atmosphere, a third valve between said first conduit and said outlet conduit, a fourth valve between said second conduit and said outlet conduit, said third and fourth valves being movable to provide for communication between said outlet conduit and said first and second conduits during a pressure equalization between said conduits, and a pulsating unit connected to said standpipes for alternately subjecting said standpipes to pressure and vacuum, one of the standpipes being under vacuum while the other is under pressure whereby during the vacuum in said standpipes milk is discharged to the standpipes and during pressure in said standpipes milk is discharged to said outlet pipe.

3. A milk releaser comprising an upright container having a receiving chamber, said receiving chamber including first and second laterally spaced discharge openings positioned adjacent the lower end of said receiving chamber, a milk inlet conduit communicating with said receiving chamber for supplying milk thereto, an air outlet conduit in communication with said chamber, means adapted to connect said air outlet conduit to a source of vacuum, first and second discharge chambers respectively disposed below said first and second discharge openings for communication therewith, a first standpipe connected to said first discharge chamber, a second standpipe connected to said second discharge chamber, said standpipes being laterally spaced with respect to said container and having major portions thereof disposed between the upper and lower ends of said container, a first valve over said first discharge opening, a second valve over said second discharge opening, said valves being movable from said openings during a vacuum equalization between said receiving chamber and said standpipes for discharging milk to said standpipes, an outlet conduit having an opening adapted to communicate with said discharge chambers to receive milk therefrom, said outlet conduit being in communication with the atmosphere, a third valve between said first discharge chamber and said outlet conduit, a fourth valve between said second discharge chamber and said outlet conduit, said third and fourth valves being movable to provide for communication between said outlet conduit and said discharge chambers during a pressure equalization between the chambers and said conduit, and a pulsating unit connected to said standpipes for alternately subjecting said standpipes to pressure and vacuum, one of the standpipes being under vacuum while the other is under pressure, whereby during the vacuum in said standpipes milk is discharged to the standpipes and during pressure in said standpipes milk is discharged to said outlet pipe.

4. A milk releaser comprising an upright container having a receiving chamber, said receiving chamber including first and second discharge openings, a milk inlet conduit communicating with said chamber for supplying milk thereto, an air outlet conduit in communication with said chamber, means adapted to connect said air outlet conduit to a source of vacuum, first and second discharge chambers respectively disposed below said first and second discharge openings for communication therewith, a first standpipe connected to said first discharge chamber, a second standpipe connected to said second discharge chamber, said standpipes being laterally spaced with respect to said container and having major portions thereof disposed between the upper and lower ends of said container, a first valve over said first discharge opening, a second valve over said second discharge opening, said valves being movable from said openings during a vacuum equalization between said receiving chamber and said standpipes for discharging milk to said standpipes, an outlet conduit having an opening adapted to communicate with said first and second discharge chambers to receive milk therefrom, said outlet conduit being in communication with the atmosphere, a third valve between said first discharge chamber and said outlet conduit, a fourth valve between said second discharge chamber and said outlet conduit, said third and fourth valves being movable to provide for communication between said outlet conduit and said discharge chambers during a pressure equalization between said chambers and said outlet conduit, and a pulsating unit connected to said standpipes for alternately subjecting one of said standpipes to vacuum and the other to atmosphere, one of said standpipes being under vacuum while the other is under pressure, whereby during the vacuum in one standpipe milk is discharged to the standpipe from the receiving chamber, and whereby during pressure in said other standpipe milk is discharged from said last mentioned standpipe to said outlet conduit.

5. A milk releaser comprising a container, a milk inlet pipe in communication with the interior of said container, an air outlet pipe in communication with said container, said outlet pipe being adapted to connect to a vacuum source, a valve structure disposed at a lower portion of said container, said valve structure comprising first and second laterally spaced discharge valves, first and second laterally spaced chambers below said discharge valves, said first and second chambers being positioned to receive milk from the container through said first and second valves during a vacuum equalization between said container and said chambers, first and second standpipes in communication respectively with said first and second chambers, said standpipes being laterally spaced with respect to said container and having major portions thereof disposed between the upper and lower ends of said container, an outlet conduit adapted to communicate with said first and second chambers, third and fourth valves disposed between said first and second chambers and said outlet conduit, said third and fourth valves being laterally spaced with respect to each other, and first and second pulsator connections in communication with said standpipes for supplying vacuum and pressure to said standpipes, one of said standpipes being under pressure while the other is under vacuum whereby the standpipe under vacuum receives milk discharged from said container, and whereby the standpipe under pressure discharges milk therefrom through one of the third and fourth valves whereby milk from said last mentioned standpipe is discharged to said outlet conduit.

6. A milk releaser comprising a container, a milk inlet pipe in communication with the interior of said container, an air outlet pipe in communication with said container, said outlet pipe being adapted to connect to a vacuum source, a valve structure disposed at a lower portion of said container, said valve structure comprising first and second discharge valves, first and second laterally spaced chambers below said discharge valves, said first and second chambers being positioned to receive milk from the container through said first and second valves during a vacuum equalization between said container and said chambers, first and second standpipes in communication respectively with said first and second chambers, said standpipes being laterally spaced with respect to said container and having major portions thereof disposed between the upper and lower ends of said container, an outlet conduit adapted to communicate with said first and second chambers, third and fourth valves disposed between said first and second chambers and said outlet conduit, said third and fourth valves being spaced with respect to each other, and a pulsator in communication with said standpipes for alternately supplying vacuum and pressure to said standpipes, one of said standpipes being under pressure while the other is under vacuum whereby the standpipe under pressure discharges milk therefrom through one of the third and fourth valves whereby milk from said last mentioned standpipe is discharged to said outlet conduit.

7. A milk releaser in accordance with claim 6, wherein said standpipes have a relatively small volume capacity and wherein during the vacuum condition in one of said standpipes a small portion of the milk is released by gravity from the container to the standpipe to a point where the liquid level in the standpipe equals the liquid level in the container.

8. A milk releaser comprising a jar-type container having an open end, said jar-type container being positioned in an inverted position, a valve structure over the open end of said container, a milk inlet conduit extending inwardly through said valve structure and terminating adjacent the upper end of said container, an air outlet conduit extending through the valve structure into said container, said air outlet conduit being adapted to connect to a source of vacuum, first and second chambers in said valve structure positioned below said container, a first valve on said structure movable to discharge milk from the container to said first chamber, a second valve on said structure movable to discharge milk from the container to said second chamber, first and second conduits respectively in communication with said first and second chambers, a standpipe connected to each of the first and second conduits, each standpipe having a relatively small diameter in cross section, said standpipes being laterally spaced with respect to said container and having major portions thereof disposed between the upper and lower ends of said container, a discharge chamber disposed between said first and second chambers, a third valve positioned between the first chamber and the discharge chamber, a fourth valve disposed between the second chamber and said discharge chamber, an outlet conduit in communication with the discharge chamber, and a pulsating unit connected to said standpipes said unit being operable to intermittently subject each standpipe to vacuum and pressure, one standpipe being under vacuum while the other is under pressure, the standpipe under vacuum having its vacuum equalized with the vacuum in the container whereupon a portion of the milk in the container flows by gravity through one of said first and second valves into the standpipe to a point where the liquid level in said standpipe equals the liquid level in the container, and wherein the pressure in the other standpipe and in the discharge chamber is equalized wherein milk flows by gravity from the other standpipe through one of the third and fourth valves to said outlet conduit.

9. A milk releaser comprising a jar-type container having an open end, said jar-type container being positioned in an inverted position, a valve structure over the open end of said container, a milk inlet conduit extending inwardly through said valve structure and terminating adjacent the upper end of said container, an air outlet conduit extending through the valve structure into said container, said air outlet conduit being adapted to connect to a source of vacuum, first and second chambers in said valve structure positioned below said container, a first valve on said structure movable to discharge milk from the container to said first chamber, a second valve on said structure movable to discharge milk from the container to said second chamber, a standpipe connected to each of the first and second chambers, each standpipe having a relatively small diameter in cross section, said standpipes being laterally spaced with respect to said container and having major portions thereof disposed between the upper and lower ends of said container, a discharge chamber disposed between said first and second chambers, a third valve positioned between the first chamber and the discharge chamber, a fourth valve disposed between the second chamber and said discharge chamber, an outlet conduit in communication with the discharge chamber, and a pulsating unit connected to said standpipes said unit being operable to intermittently subject each standpipe to vacuum and pressure, one standpipe being under vacuum while the other is under pressure, the standpipe under vacuum having its vacuum equalized with the vacuum in the container whereupon a portion of the milk in the container flows by gravity through one of said first and second valves into the standpipe to a point where the liquid level in said standpipe equals the liquid level in the container, and wherein the pressure in the other standpipe and in the discharge chamber is equalized wherein milk flows by gravity from the other standpipe through one of the third and fourth valves to said outlet conduit.

References Cited in the file of this patent
UNITED STATES PATENTS

| | | |
|---|---|---|
| 1,332,318 | Bower | Mar. 2, 1920 |
| 1,846,805 | Hapgood | Feb. 23, 1932 |
| 2,015,127 | Rieger | Sept. 24, 1935 |
| 2,243,507 | Neumann | May 27, 1941 |
| 2,528,642 | Cover | Nov. 7, 1950 |